No. 807,073. PATENTED DEC. 12, 1905.
L. W. GROAT.
BICYCLE TIRE.
APPLICATION FILED MAR. 25, 1896.

Witnesses
Walter E. Lombard
Thomas J. Drummond

Inventor:
Louis W. Groat,
by Crosby & Gregory
Attys.

UNITED STATES PATENT OFFICE.

LOUIS W. GROAT, OF HUDSON, NEW YORK.

BICYCLE-TIRE.

No. 807,073.  Specification of Letters Patent.  Patented Dec. 12, 1905.

Application filed March 25, 1896. Serial No. 584,767.

*To all whom it may concern:*

Be it known that I, LOUIS W. GROAT, of Hudson, county of Columbia, State of New York, have invented an Improvement in Bicycle-Tires, of which the following description, in connection with the accompanying drawings, is a specification, like letters on the drawings representing like parts.

The invention to be hereinafter described relates to wheel-tires, and more particularly to that type intended to be inflated by air or other fluid; and the object of the invention, generally stated, is the production of a form of tire which while possessing the requisite degree of elasticity or resiliency to take up shock will possess great strength and durability.

The invention consists, essentially, in a tire having as a part thereof a knitted metallic tube contained within an outer covering of rubber or like flexible material, the said metallic tube being knitted from wire in its soft or malleable state and then tempered after being so knit to give it great elasticity.

It has heretofore been proposed to make a tire of a woven tube having a rubber covering; but such woven tube, especially if formed of metal or wire, lacks the elasticity desirable by reason of the straight and right-angled disposition of the warp and weft threads. Also an armor or protector for hose has been proposed in which a ribbon or strip of knitted wire is wound spirally around the outside of the hose, the meeting edges of the wound strip being tied or stitched together. Also it has been proposed to strengthen fire-hose by wires wound spirally on the exterior of the hose or embedded therein. I lay no claim, however, to any of these devices, as my present invention differs from any and all of these and consists of a knitted metallic tube—that is, a tube knit of wires in circular courses with the wales of the tubular knitted wire running longitudinally of the tube and tire—the said metallic knitted tube being tempered and embedded in an exterior rubber tire, whereby the expansible quality of the finished tire is maintained, the life and durability of the tire increased, and the resilient character thereof secured, it being understood that a knit tubular fabric is made without seam and, unlike a woven fabric, is elastic and expansible in all directions.

Figure 1:
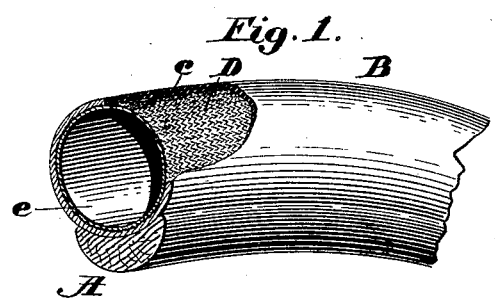
Figure 2:
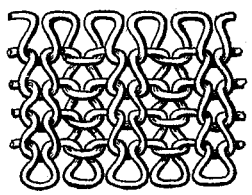

Figure 1 shows part of a wheel-rim and part of a tire embodying my invention, and Fig. 2 shows the knitted stitch of the metallic tube.

The wheel-rim A is and may be of any usual material. This rim has applied to it a tire B, the said tire, as herein shown, presenting an outer tube $c$ of india-rubber, and inside this outer tube is a knitted tube D, the same being made from wire circularly knitted course after course to form a tube, the stitch being substantially as indicated in Fig. 2. Inside this knitted metallic tube I may place a second india-rubber tube $e$.

In the manufacture of the tube $d$ the wire in a soft malleable condition will be knitted into tubular form by knitting-machine needles, the knitting being preferably the stitch known as "rib-stitch." This knitted tube may then be tempered and the wire made resilient or springy and be drawn into an outer rubber tube, the said tubes being provided in usual manner with a small pipe or tube extended through the rim, through which to inflate the tire in usual way.

The knitted tube lined may be laid as an inner tube in a usual outer tube, such tubes as have their edges shaped and adapted to engage parts of the rim to hold them in place when inflated.

The knitted tube will expand when inflated, as the knitted stitch permits this, whereas a woven-wire fabric would not stretch at all.

Having thus described my invention, what I claim as new, and desire to secure by Letters Patent, is—

1. A wheel-tire comprising an outer portion and an inner portion separate from the outer portion, said inner portion comprising a looped or knitted fabric formed of metallic wire, the wales of the knitted fabric extending longitudinally of the tire.

2. A wheel-tire comprising a knitted tube formed of malleable wire and an outer covering of rubber, the said knitted malleable wire tube being drawn into and embedded in the rubber covering.

3. A pneumatic tire comprising an outer rubber tube, and an inner tube formed of wire circular knit course after course to produce a tube without seam, said wire tube being drawn into the outer tube.

4. A pneumatic tire comprising an outer rubber covering and an inner metallic tube formed of malleable wire knitted circularly course after course throughout the circular extent of said wire in rib-stitch, the said tube being then tempered to give resiliency and spring to the knitted tube, the wales of said knitted tube extending circularly of the tire.

5. A wheel-tire composed of a knitted or interlooped inner tube formed of wire and an outer tube surrounding the inner wire tube.

6. A wheel-tire comprising a knitted tube formed of malleable wire and then tempered, the said tube having an outer and an inner covering of rubber.

7. A pneumatic tire comprising an outer tube and an inner tube, said inner tube being formed of interlooped or knitted malleable wire, the wales whereof extend longitudinally of the tire.

In testimony whereof I have signed my name to this specification in the presence of two subscribing witnesses.

LOUIS W. GROAT.

Witnesses:
SY. SOUTHARD,
ELBERT PAYNE.